3,019,120
ADHESIVE COMPOSITIONS
Jordan V. Bauer and Lee H. Elizer, Keokuk, Iowa, assignors to The Hubinger Company, Keokuk, Iowa, a corporation of Iowa
No Drawing. Filed Mar. 25, 1959, Ser. No. 801,711
10 Claims. (Cl. 106—213)

This invention relates to water-resistant starch adhesives and, more particularly to starch adhesives comprising ungelatinized starch, dispersed in an aqueous gelatinized starch carrier.

Such adhesives are particularly adapted to meet the bonding requirements in the manufacture of corrugated paper board and are described in detail in U.S. Patents 2,051,025 and 2,102,937. At present, the major proportion of corrugated paper board manufactured in the United States is made with this type of adhesive.

The adhesive consists essentially of raw starch or a starch-containing material dispersed in an aqueous carrier medium comprising gelatinized starch. The ungelatinized starch is preferably in major proportion by weight based on total solids, though it can vary from as little as 15% to as much as 85%. The raw and gelatinized starch mixture is applied to the exposed tips of the corrugated paper strip, the liner sheet applied, and the paper assembly passed through the corrugating machine, where it is heated to temperatures sufficiently high to cook "in situ" the raw starch component. The resulting stiff gel forms an immediate bond between the corrugations and the liner. This "in situ" method of bonding increases the proportion of water which can be employed in the adhesive and gives much more rapid bonding speed than is possible with conventional, entirely pregelatinized starch adhesives.

Although the cooked "in situ" starch compositions can be formulated so as to be acid, neutral, or alkaline, for the great majority of corrugated paper applications, alkaline adhesive formulations perform best and are least expensive. Alkalizing the adhesive composition as, for example, with a small proportion of sodium hydroxide, reduces the gelatinization temperature of the raw starch component to any desired degree. Borax can also be used in the alkaline compositions to increase the tenacity and stiffness of the adhesive gel formed after the raw starch is cooked "in situ."

The aforedescribed starch adhesive is entirely satisfactory for the bonding of ordinary corrugated board. It is, however, not water resistant, and, therefore, unsuitable for the manufacture of corrugated boxes or packing material which must withstand exposure to moist weather conditions or wetting. It cannot, for example, meet the requirements of Government specification PPP–B–636 relating to corrugated boxes for overseas shipment of military supplies, which requires that the corrugated board shown no voluntary separation of the plys after immersion in water for 24 hours. There are numerous applications where water resistant corrugated board, though not absolutely essential, is desirable and would be used if cost considerations did not make it prohibitive.

Numerous attempts have been made to devise a starch adhesive formulation of the cooked "in situ" type which would have adequate water-resistance. The most common method of imparting water resistance in use today involves the incorporation into the starch adhesive of a resin-forming composition of formaldehyde, such as urea-formaldehyde, phenol-formaldehyde, resorcinol-formaldehyde and acetone-formaldehyde. Formaldehyde alone, as well as its salts, such as sodium formaldehyde sulfoxalate or bisulfite, and its water soluble polymers, such as paraformaldehyde, will also react with starch adhesives to give good water-resistance under highly acid conditions.

The foregoing water resistance imparting agents, however, are characterized by various problems and disadvantages, which differ to some extent with the particular composition. Certain of the agents, such as urea-formaldehyde and melamine-formaldehyde, impart some water resistance under alkaline conditions but perform best in an acid medium, which, as aforementioned, adversely affects performance of the starch components, e.g., in terms of gelatinization temperature of the raw starch and bonding speed. Other agents such as the resorcinol, phenol and acetone derivatives can be satisfactorily employed under alkaline conditions but adversely affect other properties of the starch adhesive. Some of the problems encountered with the various formaldehyde reagents include poor bonding speed because of the tendency of some of the derivatives to inhibit the gelatinization of the raw starch; short working life because of impairment of stability of the adhesive manifested by loss of fluidity and the development of thixotropic "mushy" characteristics after aging for a few hours; incompatibility with certain desired components of the adhesive, such as borax; and high concentration requirements for adequate water-resistance with concomitant excessive cost.

The object of this invention is to provide new cooked "in situ" type starch adhesives having a high degree of water resistance.

Another object is the formulation of such starch adhesives employing formaldehyde or polymeric formaldehyde derivatives, whihc retain unimpaired all of the desirable properties of the starch adhesive without such additives.

Still another object is the formulation of such starch adhesives having improved water resistance with concomitant reduction in the amount of required formaldehyde or polymeric formaldehyde derivative and reduction in cost.

We have discovered that cyanamide or an alkaline salt of cyanamide, when employed under alkaline conditions is uniquely effective in improving the water resistance of starch adhesives of the cooked "in situ" type, when used as a supplementary reactant with a formaldehyde compound or polymeric formaldehyde derivative. The degree of water resistance is markedly increased, while the desirable properties of the starch adhesive, such as viscosity stability, gelatinization temperature, bonding speed, working life and other performance factors characteristic of the untreated non-water-resistant adhesive remain unimpaired. The amount of formaldehyde or formaldehyde derivative can be very substantially reduced and better waterproofing obtained than imparted by the larger quantities of the formaldehyde compound alone. These improved results are obtained, furthermore, under the alkaline conditions required for the best performance of the cooked "in situ" type of starch adhesive. Surprisingly, and, very importantly, formaldehyde and formaldehyde derivatives, such as urea-formaldehyde, which normally require an acid medium, function exceedingly well in combination with the cyanamide under conditions of relatively high alkalinity. This makes possible the use of less costly formaldehyde compounds.

When granular starch is treated in aqueous slurry with an aqueous alkaline solution of cyanamide or its alkaline salts, such as the alkali metal or alkaline earth metal salts, it reacts with the cyanamide to form a nitrogenated, cationic product. Gelatinized starch, in aqueous colloidal dispersion, also reacts with cyanamide or its salts to form cationic nitrogenated products, although, unlike the granular starch, the reaction takes place not only under alkaline conditions but also under neutral to acid conditions. Cyanamide also reacts with formaldehyde or a formaldehyde derivative at alkaline pH to form a polymeric condensation product.

This unique characteristic of cyanamide, in that it reacts both with the starch, raw and gelatinized, and with the formaldehyde compound, thereby probably promiting cross linking between the molecules of starch and the formaldehyde compound, is apparently the reason for its effectiveness in markedly improving water resistance. Another advantageous factor may be the cationic nature of the nitrogenated starch reaction product, which favors absorption onto and strong bonding to the normally anionic cellulose paper fibers. In any case, the adhesive starch film or bond has a considerably higher resistance to rehydration than is obtained when the cyanamide is not present.

The cyanamide compound employed can be cyanamide per se, in which case, the requisite alkalinity of the aqueous starch adhesive is provided by an alkaline component, such as sodium hydroxide, or it can be an alkaline salt, such as the alkali metal or alkaline earth metal salts. Examples of such salts include the sodium, potassium, calcium, magnesium and barium cyanamides and hydrogen cyanamides. Such alkaline salts when dissolved in the aqueous starch adhesive impart alkalinity to the composition. Because of the relatively small proportions used, it may often be desirable to add an additional alkaline component, such as sodium hydroxide or sodium carbonate to give the desired degree of alkalinity for such performance factors as reduced gelatinization temperature of the raw starch or increased bonding speed. Our new adhesive compositions are operative at any pH within the alkaline range. For optimum performance, we prefer a pH of about 9 to 11.5.

An appreciable increase in water resistance can be obtained with amounts of the cyanamide compound as low as about 0.5%, preferably at least 1%, by weight of the starch. Increased improvement is obtained with increasing proportions, the degree of improvement tending to level off at concentrations approaching about 12%. Larger amounts can be used to provide highly effective water resistance, but there is normally no economic advantage.

Any of the formaldehyde derivatives which impart water resistance to starch adhesives can be employed. These include, for example, a formaldehyde compound, such as formaldehyde per se, paraformaldehyde or a formaldehyde salt, e.g. Na formaldehyde sulfoxalate or bisulfite; a heat polymerizable mixture of one of said formaldehyde compounds and a compound, such as urea, phenol, resorcinol, melamine, or a ketone, e.g. acetone; and the water-soluble copolymers produced by partial polymerization of said mixtures, such as urea-formaldehyde, melamine-formaldehyde, phenol-formaldehyde, resorcinol-formaldehyde, ketone-formaldehyde, etc. The formaldehyde, as indicated above, can be employed as such, e.g. as a formalin solution, in its polymerized paraformaldehyde form, or in its addition salt form, e.g. the bisulfite. Where a polymeric derivative is employed, it can be added in a water-soluble, partially polymerized form or in the form of its water-soluble monomeric components. Curing to the insoluble polymeric state is accomplished when the adhesive is heated after application to the paper during the heat bonding step.

The amount of formaldehyde or polymeric formaldehyde derivative required is generally substantially less than would normally be required to impart good water resistance in the absence of the cyanamide. Amounts in the range of about 0.5% to 5% on the weight of the starch are usually entirely adequate. Larger amounts, for example, up to 10% or more, may sometimes be used advantageously, but, in general, amounts above about 10% do not give sufficient additional improvement to make them economically worth-while.

Other than the addition of the cyanamide, with generally concomitant reduction in the formaldehyde compound formulation of the alkaline, cooked "in situ" starch adhesive can be entirely conventional, including such routine additives as a soluble borate, such as borax, fillers, such as clay, and the like.

The cyanamide compound employed need not be a purified reagent grade. Low cost, commercial grades are entirely satisfactory. In the relatively small proportions used, such impurities as are present do not have any detrimental effect on the performance of the adhesive. We have found, for example, that the commercial, pulverized grade of calcium cyanamide manufactured by The American Cyanamide Company, designated as "Aero Calcium Cyanamide, Hydrated Grade," gives excellent results in our adhesive compositions. A typical analysis of this grade of calcium cyanamide is as follows:

| | |
|---|---|
| Calcium cyanamide (CaNCN), percent | 62.3 |
| Percent other than calcium cyanamide (ammonia, urea, dicyanamide) | 1.1 |
| Lime (CaO), percent | 11.0 |
| Carbon (C), percent | 12.1 |
| Combined water, percent | 3.5 |
| Oil (added), percent | 2.0 |
| Miscellaneous oxides and calcium salts, percent | 8.0 |

In some cases, it may be desirable, though not essential, to remove the calcium ions from solution, since this improves somewhat the viscosity and gelatinization characteristics of the adhesive. Where calcium cyanamide is used as the cyanamide compound, this can be achieved by adding a sufficient amount of a sodium or potassium salt having a calcium insolubilizing anion such as carbonate, sulfate or sulfite, to precipitate the calcium ion provided by the cyanamide salt as well as that contributed by impurities such as lime. The calcium cyanamide, by such treatment, is, in effect, converted into the sodium or potassium salt.

The test results set out in Example I demonstrates the unique efficacy of cyanamide in promoting the water resistance of a cooked "in situ" type of starch adhesive when employed with a formaldehyde compound.

EXAMPLE I

The adhesive formulations used in these experiments were prepared in a laboratory mixing device fitted with a propeller type agitator. By means of a special laboratory machine which duplicates the function of the double facer on a commercial corrugating machine, single faced corrugated paper could be bonded to a liner sheet with each of the adhesive formulations to be tested, and the resultant double faced board samples then evaluated as to degree of water resistance. The single faced corrugated paper used in these experiments comprised a 69 lb. kraft liner bonded to a 28 lb. Chemfibre corrugated sheet with a special water resistant adhesive. The double facing liner bonded to the single faced corrugated paper for test purposes was a 69 lb. kraft sheet.

The basic starch adhesive formulation employed, both in the control and in the tests including additives to impart water resistance, was typical of standard procedure in the preparation of non-water-resistant corrugating adhesives. For reasons of convenience a pregelatinized starch was employed as the carrier medium for the raw starch instead of cooking the starch carrier component to gelatinize it just prior to addition of the raw starch component as is done in regular plant operations.

A. Control: Cooked "in situ" type of starch adhesive without additives.

(1) Added 2500 cc. water to mixer and started agitator.

(2) Added 14 grams of caustic soda and 15 grams borax and mixed for about 5 minutes.

(3) Then, added 110 grams pregelatinized corn starch and 490 grams of corn starch (raw).

(4) Continued mixing for about 30 minutes. The adhesive was then ready for use.

Samples of corrugated paper board were made up on the laboratory double facing machine using the above adhesive to bond the double face liner to the single faced corrugated paper. The resultant double faced board samples were allowed to cure for 12 hours and then immersed in water at 75° F. for 24 hours. At the end of this period of immersion, the double face bond had failed and the liner had separated from the corrugated sheet. This failure of the adhesive bond and resultant ply separation is what normally occurs when corrugated board with a non-water resistant adhesive is immersed in water.

B. Cooked "in situ" type of starch adhesive plus calcium cyanamide and dimethylol urea.

(1) Added 2500 cc. of water to the mixer and started agitator.

(2) Added 10 grams of caustic soda, 15 grams of borax, 15 grams calcium cyanamide (commercial grade), 12 grams soda ash, and 10 grams dimethylol urea and mixed 5 minutes.

(3) Then added 110 grams pregelatinized corn starch and 490 grams of corn starch (raw).

(4) Continued mixing for 30 minutes. The adhesive was then ready for use.

Test samples of double faced corrugated board were made up and tested as given in Experiment A.

The performance of this adhesive formulation was equal to that of Experiment A in regard to dry adhesive bond and bonding speed. The water resistance of the double face bond, however, was excellent. No separation of the double face bond occurred after 24 hours of immersion and considerable paper fiber tear occurred when the plys were forcibly separated.

C. Cooked "in situ" type of starch adhesive plus dimethylol urea in same amount as in Experiment B, without cyanamide.

(1) Added 2500 cc. of water to the mixer and started agitator.

(2) Added 14 grams of caustic soda, 15 grams of borax, 10 grams dimethylol urea, and mixed about 5 minutes.

(3) Then added 110 grams pregelatinized corn starch and 490 grams corn starch (raw).

(4) Continued mixing for about 30 minutes. The adhesive was then ready for use.

Test samples of double faced board were made up and then tested as in Experiment A.

The performance of this adhesive formulation was equal to that of Experiment A in regard to dry adhesive bond and bonding speed. The water resistance of the double face bond, however, was poor. After 24 hours immersion, the double face bond separated as the sample was lifted from the water.

D. Cooked "in situ" type starch adhesive plus dimethylol urea in five times larger amount than used in Experiment B, without cyanamide.

(1) Added 2500 cc. water to the mixer and started agitator.

(2) Added 14 grams caustic soda, 15 grams borax, and 50 grams dimethylol urea and mixed 5 minutes.

(3) Then added 110 grams pregelatinized corn starch and 490 grams corn starch (raw).

(4) Continued mixing for about 30 minutes. The adhesive was then ready for use.

Test samples of double faced board were made up and tested as in Experiment A.

The performance of this adhesive formulation was equal to that of Experiment A in regard to dry adhesive bond and bonding speed. The water resistance of the double face bond was fair. After 24 hours immersion, the double face bond gave no evidence of voluntary separation. When forcibly separated, paper fiber tear was considerable but not as much as in Experiment B, indicating that the degree of water resistance was not quite as good.

E. Cooked "in situ" type of starch adhesive plus calcium cyanamide and paraformaldehyde.

(1) Added 2500 cc. of water to the mixer and started agitator.

(2) Added 10 grams caustic soda, 15 grams borax, 15 grams calcium cyanamide (commercial grade), 12 grams soda ash, and 5 grams paraformaldehyde, and mixed 5 minutes.

(3) Then added 110 grams pregelatinized corn starch and 490 grams corn starch (raw).

(4) Continued mixing for 30 minutes. The adhesive was then ready for use.

Test samples of double faced board were made up and tested as in Experiment A.

The performance of this adhesive formulation was equal to that of Experiment A in regard to dry adhesive bond and bonding speed. The water resistance of the double face bond was excellent. After 24 hours immersion no separation of the double face bond occurred and when forcibly separated, considerable paper fiber tear occurred. The degree of water resistance obtained with this formulation was about the same as that obtained in Experiment B.

Comparison of Experiments B and C shows that dimethylol urea (polymerized to urea-formaldehyde during heat cure) is much more effective when employed with cyanamide. Comparison of Experiments B and D shows that an amount (50 g.) of dimethylol urea twice the combined amount of dimethylol urea (10 g.) and cyanamide (15 g.) is less effective than the latter. Experiment E demonstrates the efficacy of cyanamide with formaldehyde alone as well as with its polymeric derivatives with other compounds, such as urea.

F. Cooked "in situ" type of starch adhesive plus calcium cyanamide and sodium formaldehyde bisulfite.

(1) Added 2500 cc. water to the mixer and started agitator.

(2) Added 14 grams caustic soda, 15 grams borax, 15 grams calcium cyanamide (commercial grade) and 30 grams sodium formaldehyde bisulfite, and mixed 5 minutes.

(3) Then added 110 grams pregelatinized corn starch and 490 grams corn starch (raw).

(4) Continued mixing for 30 minutes. The adhesive was then ready for use.

Test samples of double faced corrugated board were made up and tested as in Experiment A.

The performance of this adhesive formulation was equivalent to that of Experiment A in regard to both dry adhesive bond and bonding speed. The water resistance of the double face bond was equal to that obtained in Experiments B and E.

G. Cooked "in situ" type of starch adhesive plus calcium cyanamide and sodium formaldehyde sulfoxalate.

Formulation was identical to that of Experiment F except that sodium formaldehyde sulfoxalate was substituted for the bisulfite salt.

Adhesive performance and degree of water resistance was equivalent to that obtained with the adhesive of Experiment F.

H. Cooked "in situ" type of starch adhesive plus calcium cyanamide, paraformaldehyde and sodium sulfite.

(1) Added 2500 cc. water to the mixer and started agitator.

(2) Added 5 grams caustic soda, 15 grams borax, 15 grams calcium cyanamide (commercial grade), 22 grams sodium sulfite, and 5 grams paraformaldehyde and mixed 5 minutes.

(3) Then added 110 grams pregelatinized corn starch and 490 grams corn starch (raw).

(4) Continued mixing for about 30 minutes. The adhesive was then ready for use.

The performance and degree of water resistance obtained with this formulation was equivalent to that obtained in Experiment F.

I. Cooked "in situ" type of starch adhesive plus calcium cyanamide and a water-soluble, partially polymerized urea-formaldehyde resin, Urac 110, manufactured by The American Cyanamide Company.

Formulation of the adhesive was the same as in Experiment B except that Urac 110 was substituted for dimethylol urea.

Adhesive performance and degree of water resistance was equivalent to that obtained with the adhesive of Experiment B.

The following examples illustrate preparation of the cooked "in situ" type of adhesive for use in bonding corrugated paper board on a plant scale in a mixing machine generally employed in the industry and known as a "Henry Pratt Mixer." It consists of one mixing tank with a double action agitator, the primary mixer in which the carrier or gelatinized starch component is prepared, mounted above a second mixing tank fitted with propeller-type agitators, the secondary mixer in which the carrier is admixed with the raw starch component.

EXAMPLE II

This example illustrates the preparation of a typical starch adhesive used in the corrugating industry for the manufacture of ordinary, non-water-resistant corrugated paper board.

A 670 gallon batch of the adhesive is prepared as follows:

*Primary mixer*

(1) Add 80 gallons of water to the primary mixer.
(2) Add 180 pounds of corn starch and start agitator.
(3) Dissolve 30 pounds of caustic soda (sodium hydrate) in 6 gallons of water and add this solution to the starch mixture as it is being agitated.
(4) Heat the mixture to 140° F. in order completely to gelatinize the starch and hold at this temperature for 15 minutes.
(5) At the end of this time, stop agitator and add cold water to bring the total volume in the primary mixer to 196 gallons. Then start agitator and mix for about 5 minutes. This constitutes the gelatinized carrier component of the adhesive which is subsequently added to the raw starch component of the adhesive in the secondary mixer.

*Secondary mixer*

(1) Add 370 gallons of water to the secondary mixer, start agitator and heat to 90° F.
(2) Add 26 pounds of borax (5 mol.) and 1020 pounds of corn starch.
(3) After these ingredients have been mixed for about 5 minutes, open the dump valve on the primary mixer and slowly add the carrier component of the adhesive mix to the contents of the secondary mixer.
(4) After the carrier has been added, the total mix is agitated for about 30 minutes. This constitutes the final adhesive product and it is ready for use on the corrugating machine.

Corrugated board bonded with this adhesive separates voluntarily after immersion in water for 24 hours.

EXAMPLE III

This formulation adds calcium cyanamide, soda ash and formaldehyde to the adhesive of Example II.

The gelatinized carrier component was made in the primary mixer just as in Example II, except that the caustic soda was reduced from 30 to 20 pounds because of the alkaline nature of the subsequently added calcium cyanamide and soda ash.

The mix in the secondary mixer is modified by the addition of 35 pounds commercial grade calcium cyanamide, 30 pounds soda ash and 28 pounds formaldehyde (37%). The procedure otherwise is identical with that of Example II.

EXAMPLE IV

This adhesive is formulated as in Example III, except that 25 pounds of dimethylol urea were substituted for the 28 pounds of formaldehyde.

EXAMPLE V

This adhesive is formulated as in Example III, except that 15 pounds of a commercially available urea-formaldehyde concentrate (85% solids content: formaldehyde:urea mol ratio=4.6:1; "U.F. 85 Concentrate," Allied Chemical and Dye Corp.) were substituted for the 28 pounds of formaldehyde.

EXAMPLE VI

This adhesive is formulated as in Example III, except that 10 pounds of resorcinol are added with the 180 pounds of corn starch in the primary mixture and 6 pounds of paraformaldehyde are added with the CaNCN and soda ash in the secondary mixer.

EXAMPLE VII

This formulation is similar to that of Example III, except that the raw corn starch component added in the secondary mixer was increased to 1600 pounds and 60 pounds of a water-soluble, partially polymerized urea-formaldehyde composition ("Arboneeld A," E. I. du Pont de Nemours & Co.) were substituted for the 28 pounds of formaldehyde. This increase in raw starch and formaldehyde derivative maximizes water resistance.

EXAMPLE VIII

This example illustrates the preparation of a water resistant corrugating adhesive which is supplied to the user in the form of a prepared dry blend utilizing a pregelatinized starch as the carrier component. By the use of a prepared blend of this nature, the mixing of the adhesive is greatly simplified since no separate cooking and preparation of the carrier portion is required. It is only necessary to mix the dry blend with water to prepare the adhesive. A typical adhesive formulation of this nature is as follows:

| | Lbs. |
|---|---|
| Corn starch (raw) | 1060 |
| Pregelatinized corn starch | 210 |
| Calcium cyanamide (commercial grade) | 60 |
| Soda ash | 50 |
| Paraformaldehyde | 20 |
| Total | 1400 |

To prepare a 600 gallon batch of water resistant adhesive from this blend in the Henry Pratt mixing machine, only the secondary mixer is required.

(1) Add 480 gallons of water and heat to 95° F.
(2) Start agitator and add 1400 pounds of dry adhesive blend.
(3) Continue agitation for about 30 minutes. The adhesive is then ready for use on the corrugating machine.

EXAMPLE IX

Adhesives prepared as disclosed in Examples III–VIII were employed as the bonding agent in making corrugated paper boards, which were then tested for water resistance. After immersion in water for 24 hours, all showed excellent water resistance. There was no voluntary separation and forcible separation resulted in very considerable paper fiber tear.

Although this invention has been described with reference to illustrative embodiments thereof, it will be apparent to those skilled in the art that the principles of this invention can be embodied in other forms but within the scope of the claims.

We claim:
1. A cooked "in situ" type, potentially water-resistant adhesive composition consisting essentially of an alkaline mixture of ungelatinized starch, gelatinized starch, at least 0.5% by weight of the starch of a water-resistance imparting material selected from the group consisting of formaldehyde, paraformaldehyde, a formaldehyde bisulfite salt, a formaldehyde sulfoxalate salt, and a water soluble monomeric methylol compound formed from formaldehyde which is capable of polymerizing to a water insoluble state and at least about 0.5% by weight of the starch of a cyanamide compound selected from the group consisting of cyanamide and alkaline salts of cyanamide.

2. The composition of claim 1 in which the cyanamide compound is present in amount at least 1% by weight of the starch and the pH of the adhesive composition is at least about 9.

3. A cooked "in situ" type, potentially water-resistant, starch adhesive consisting essentially of an alkaline mixture of ungelatinized starch, gelatinized starch, at least about 0.5% by weight of the starch of a water-resistance imparting material selected from the group consisting of formaldehyde, paraformaldehyde, a formaldehyde bisulfite salt, a formaldehyde sulfoxalate salt, and a water soluble monomeric methylol compound formed from formaldehyde which is capable of polymerizing to a water insoluble state, and at least about 1% by weight of the starch of a cyanamide compound selected from the group consisting of cyanamide and alkaline salts of cyanamide.

4. The composition of claim 3 in which the pH of the adhesive composition is about 9 to 11.5.

5. The composition of claim 3 in which the formaldehyde compound is paraformaldehyde.

6. The composition of claim 3 in which the cyanamide is calcium cyanamide.

7. The composition of claim 3 including as an additional component an alkali metal salt which reacts with calcium ion to form an insoluble calcium salt.

8. The composition of claim 3 in which the cyanamide compound is calcium cyanamide, and the composition also contains sodium carbonate.

9. The composition of claim 3 in which the formaldehyde compound is paraformaldehyde, and the cyanamide compound is calcium cyanamide.

10. A cooked "in situ" type, potentially water-resistant, starch adhesive consisting essentially of an alkaline mixture of ungelatinized starch, gelatinized starch, 0.5% to 10% by weight of the starch of a water-resistance imparting material selected from the group consisting of formaldehyde, paraformaldehyde, a formaldehyde bisulfite salt, a formaldehyde sulfoxalate salt, and a water soluble monomeric methylol compound formed from formaldehyde which is capable of polymerizing to a water insoluble state, and 0.5% to 12% by weight of the starch of a cyanamide compound selected from the group consisting of cyanamide and alkaline salts of cyanamide.

References Cited in the file of this patent

UNITED STATES PATENTS

| | | |
|---|---|---|
| 2,566,861 | Studeny | Sept. 4, 1951 |
| 2,626,934 | Kesler | Jan. 27, 1953 |
| 2,632,743 | Eckert | Mar. 24, 1953 |